(12) United States Patent
Sakaue

(10) Patent No.: US 8,299,758 B2
(45) Date of Patent: Oct. 30, 2012

(54) CHARGING CONTROLLER

(75) Inventor: Masaaki Sakaue, Hikone (JP)

(73) Assignee: Panasonic Electric Works Power Tools Co., Ltd., Shiga (JP)

( * ) Notice: Subject to any disclaimer, the term of this patent is extended or adjusted under 35 U.S.C. 154(b) by 367 days.

(21) Appl. No.: 12/656,750

(22) Filed: Feb. 16, 2010

(65) Prior Publication Data

US 2010/0207581 A1 Aug. 19, 2010

(30) Foreign Application Priority Data

Feb. 17, 2009 (JP) .................................. 2009-034270

(51) Int. Cl.
*H02J 7/00* (2006.01)

(52) U.S. Cl. ........................ 320/134; 320/136; 320/142

(58) Field of Classification Search .................. 320/134, 320/162
See application file for complete search history.

(56) References Cited

U.S. PATENT DOCUMENTS

| | | | |
|---|---|---|---|
| 4,583,034 A * | 4/1986 | Martin | 320/134 |
| 5,705,910 A * | 1/1998 | Kito et al. | 320/132 |
| 6,028,415 A * | 2/2000 | Nagai et al. | 320/162 |
| 6,172,482 B1 * | 1/2001 | Eguchi | 320/134 |
| 2003/0062872 A1 | 4/2003 | Brotto | |
| 2007/0108940 A1 | 5/2007 | Sainomoto et al. | |

FOREIGN PATENT DOCUMENTS

| | | |
|---|---|---|
| JP | S61122573 | 8/1986 |
| JP | 2000032674 | 1/2000 |
| JP | 2007-143284 | 6/2007 |
| JP | 2008061363 | 3/2008 |

OTHER PUBLICATIONS

The Japanese office action dated Nov. 2, 2010 and English summary thereof.

* cited by examiner

*Primary Examiner* — M'Baye Diao
(74) *Attorney, Agent, or Firm* — Bacon & Thomas, PLLC

(57) ABSTRACT

A charging controller connected to at least one of secondary cells and detachably connected to a charger or a cell driver, the charging controller including: a charging amount control circuit detecting a cell voltage of each secondary cell and outputting a charging control signal for instructing the charger to reduce a charging current when the detected cell voltage exceeds the target voltage; and a protection circuit detecting a cell voltage of each secondary cell and cutting off a current path from the charger to the secondary cell when the detected cell voltage exceeds the upper limit voltage, the protection circuit operating by using the secondary cell as a power source while at least the charger is not connected. In the charging controller, while neither the charger nor the cell driver are connected, the charging amount control circuit does not operate.

10 Claims, 4 Drawing Sheets

CHARGING CONTROLLER

FIELD OF THE INVENTION

The present invention relates to a charging controller.

BACKGROUND OF THE INVENTION

Conventionally, there is presented a charging controller which is connected to at least one secondary cell and also detachably connected to a charger or a cell driver to control charging from the charger to the secondary cell.

Such charging controller includes a charging amount control circuit controlling a charger to charge up a cell voltage to a target voltage and a protection circuit preventing an overcharging. The charging amount control circuit outputs a charging control signal that instructs the charger to decrease a charging current when the cell voltage of any one of the secondary cells exceeds the target voltage. Further, the protection circuit prevents the overcharging by blocking a current path from the charger to the secondary cell when the cell voltage exceeds an upper limit voltage (see, e.g., Japanese Patent Application Publication No. 2007-143284)

In the conventional charging controller, both of the charging amount control circuit and the protection circuit is supplied a power from the charger. Therefore, if a circuit generating the power in the charger becomes out of order, the charging amount control circuit and the protection circuit cannot properly work, which may lead to an overcharging.

In this regard, there may be considered using a secondary cell as a power source in order to make certain that the charging amount control circuit and the protection circuit always work. However, with this case, even if the secondary cell is in a standby state where the charger and the cell driver are not connected, power of the secondary cell is unnecessarily consumed.

SUMMARY OF THE INVENTION

In view of the above, the present invention provides a charging controller capable of suppressing consumption of a secondary cell in a standby state while preventing an overcharging.

In accordance with an aspect of the present invention, there is provided a charging controller connected to at least one of secondary cells and detachably connected to a charger or a cell driver. The charging controller includes: a charging amount control circuit detecting a cell voltage of each secondary cell, comparing the detected cell voltage with a respective predetermined target voltage, and outputting a charging control signal for instructing the charger to reduce a charging current when the detected cell voltage exceeds the target voltage; and a protection circuit detecting a cell voltage of each secondary cell, comparing the detected cell voltage with a predetermined upper limit voltage higher than the respective target voltage, and cutting off a current path from the charger to the secondary cell when the detected cell voltage exceeds the upper limit voltage, the protection circuit operating by using the secondary cell as a power source while at least the charger is not connected. In the charging controller, while neither the charger nor the cell driver are connected, the charging amount control circuit does not operate.

With the above configuration, while the charger is not connected, the protection circuit can surely prevent the overcharging by using the secondary cell as a power source. Further, when the charger and the cell driver are not connected (standby state), the charging amount control circuit does not work. Therefore, consumption of the secondary cell can be suppressed in the standby state, comparing to the conventional art where the charging amount control circuit always works by using the secondary cell as a power source.

In the charging control in accordance with an aspect of the present invention, the protection circuit intermittently operates while neither the charger nor the cell driver are connected.

With this configuration, consumption of the secondary cell can be suppressed in the standby state, as compared to the case where the protection circuit continues to work even when the charger and the cell driver are not connected.

In the charging control in accordance with an aspect of the present invention, the charging amount control circuit operates by using the secondary cell as a power source only when a control trigger signal is being inputted from the charger while at least the secondary cells are charged, and the control trigger signal is not inputted while neither the charger nor the cell driver are connected.

In the charging control in accordance with an aspect of the present invention, the charging amount control circuit is supplied a power from the charger.

The charging control in accordance with an aspect of the present invention further includes an overdischarging prevention circuit detecting a cell voltage of each secondary cell; comparing the detected cell voltage with a predetermined lower limit voltage lower than the respective target voltage; and outputting a discharging control signal for instructing the cell driver to stop receiving power from the secondary cell when the cell voltage is lower than the lower limit voltage, wherein the overdischarging prevention circuit does not operate while neither the charger nor the cell driver are connected.

With the above configuration, the overcharging of the secondary cell can be prevented by the overdischarging prevention circuit. Further, since the overdischarging prevention circuit does not operate in the standby state, the consumption of the secondary cell can be suppressed in the standby state as compared to the case where the overdischarging prevention circuit continues to work by using the secondary cell as a power source.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in more detail with reference to accompanying drawings which form a part hereof.

Figure 1:
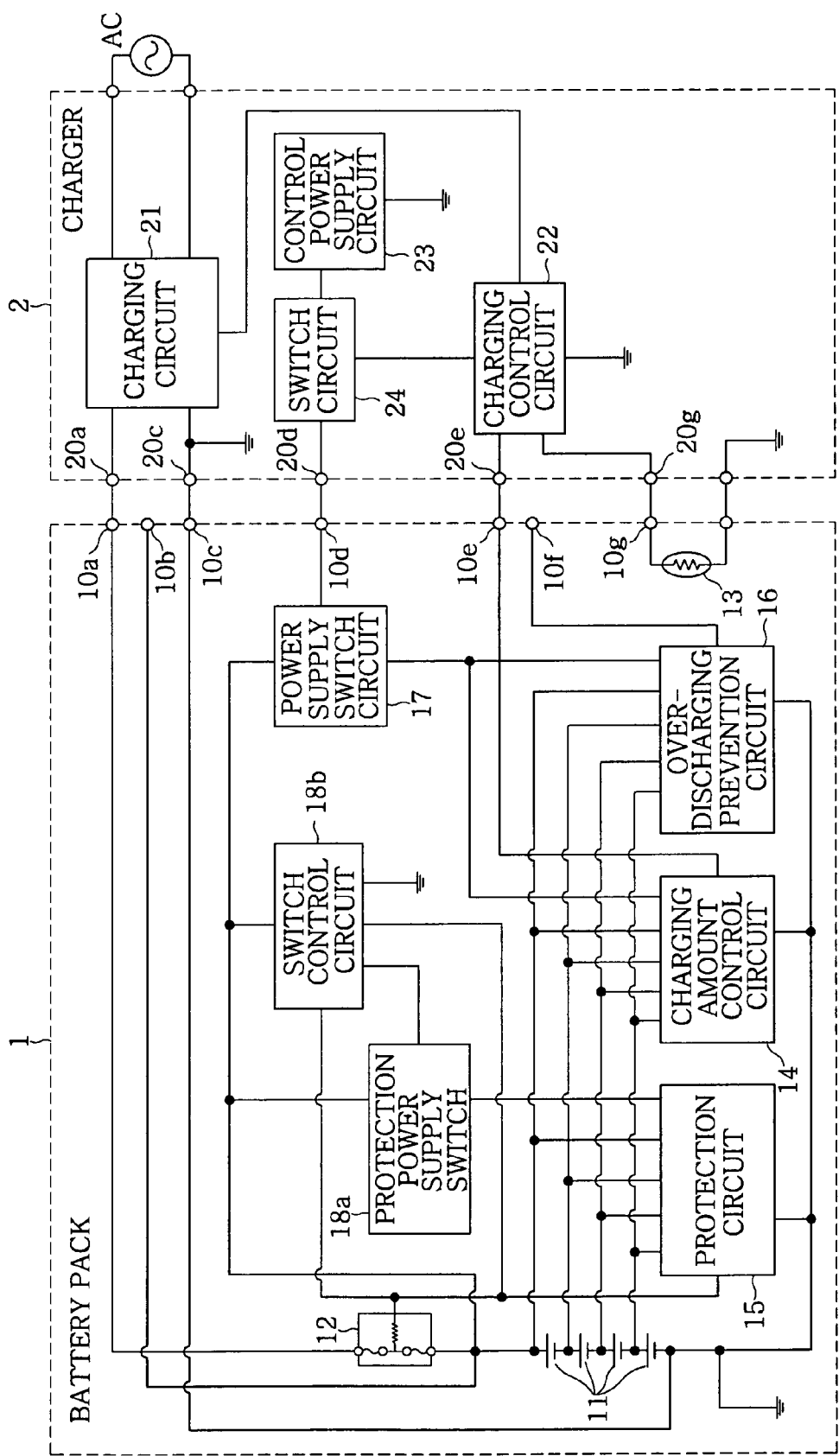
FIG. 1 is a block diagram showing a state where a charging controller in accordance with an embodiment of the present invention is connected to a charger.
Figure 2:
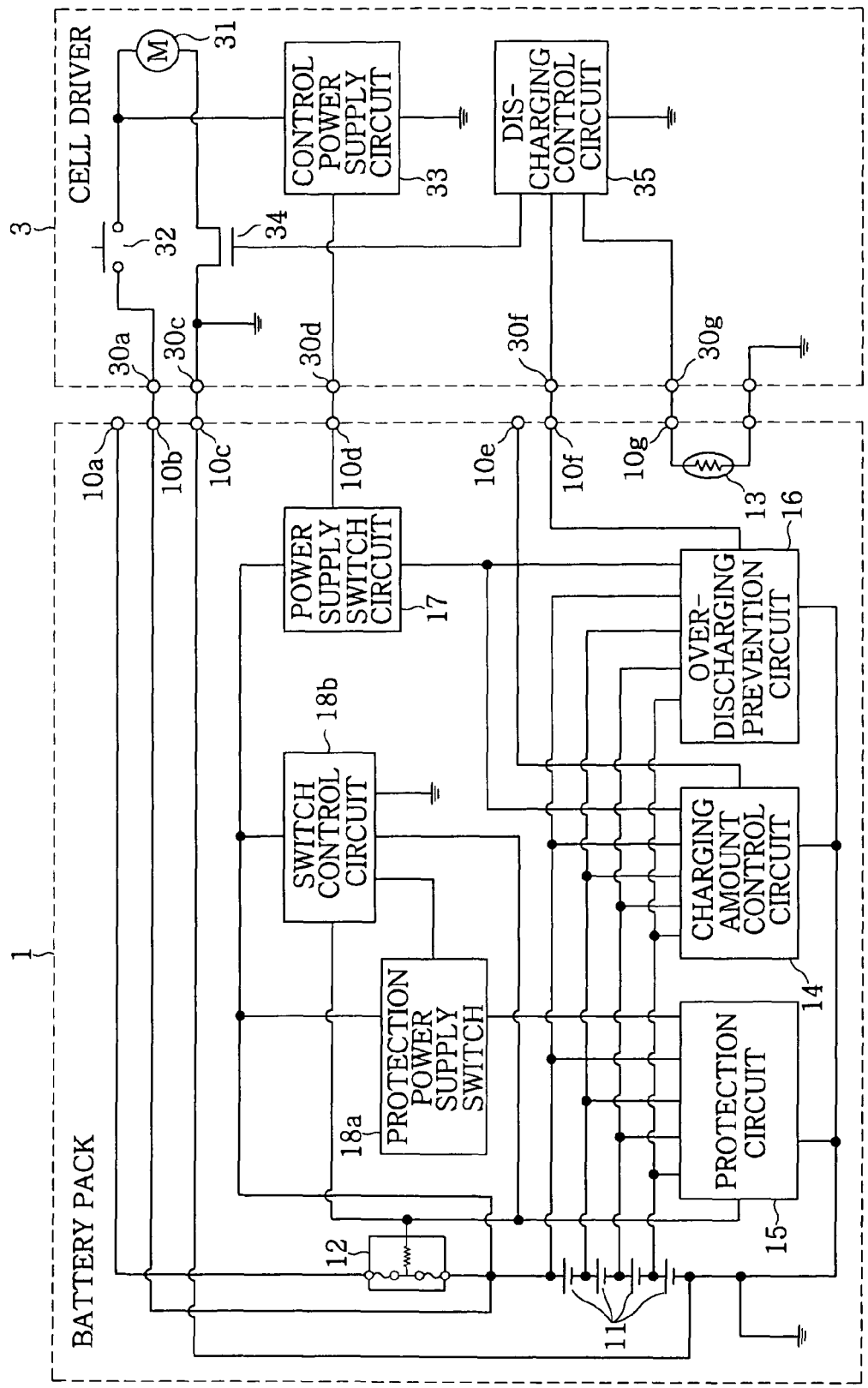
FIG. 2 is a block diagram showing a state where a charging controller in accordance with the embodiment of the present invention is connected to a cell driver.

Referring to FIGS. 1 and 2, a battery pack 1 is constituted by a charging controller in accordance with an embodiment of the present invention and a serial circuit including a plurality of (e.g., 4 in the drawing) secondary cells 11. The battery pack 1 is detachably connected to a charger 2 charging the secondary cell 11 as shown in FIG. 1 or a cell driver 3 operated by using the secondary cell as a power source as shown in FIG. 2.

The battery pack 1 includes a charging terminal 10a to which an output terminal at a high voltage side of the serial circuit of the secondary cells 11 is connected and the DC power (referred to as a 'charging power' hereinafter) for charging the secondary cells is inputted; a discharging terminal 10b connected to the output terminal at the high voltage side of the serial circuit of the secondary cells 11; and ground terminal 10c connected to the ground and the output terminal at a low voltage side of the serial circuit of the secondary cells 11. The battery pack 1 further includes a control power supply terminal 10d to which a DC power (referred to as a 'control power' hereinafter) of a constant voltage serving as a power source of the charging controller, e.g., 5 V, is inputted; and a charging control terminal 10e for outputting a charging control signal to the charger 2 which instructs the charger 2 to reduce a current value (referred to as a 'charging current' hereinafter) of the charging power.

Furthermore, the battery pack 1 is provided with a discharging control terminal 10f for outputting a discharging control signal to the cell driver 3 that instructs the cell driver 3 to block (i.e., cut off the discharging of the secondary cell) inputting (receiving) of the DC power from the secondary cell 11. Also, the battery pack 1 includes a temperature detection element 13, e.g., thermistor, provided in close contact with the secondary cell 11 to detect a temperature thereof; and a temperature detection terminal 10g electrically connected to one end of the temperature detection element 13 to output a detection result thereof.

Meanwhile, the charger 2 is provided a charging terminal 20a for outputting the charging power; a ground terminal 20c connected to the ground; a control power supply terminal 20d for outputting the control power; a charging control terminal 20e to which the charging control signal is inputted; and a temperature detection terminal 20g to which the output of the temperature detection element 13 of the battery pack 1 is inputted. Thus, when the battery pack 1 is connected to the charger 2, the charging terminal 10a, the ground terminal 10c, the control power terminal 10d, the charging control terminal 10e and the temperature detection terminal 10g of the battery pack 1 are respectively connected to the charging terminal 20a, the ground terminal 20c, the control power terminal 20d, the charging control terminal 20e and the temperature detection terminal 20g of the charger 2 to be conducted with each other.

Further, the charger 2 includes a charging circuit 21 for receiving a power from an external AC power source and generating the charging power to output via the charging terminal 20a; a charging control circuit 22 for controlling the charging circuit 21 depending on the charging control signal inputted to the charging control terminal 20e and the output of the temperature detection element 13 inputted to the temperature detection terminal 20g; a control power supply circuit 23 for generating a control power; and a switch circuit 24 provided between the control power supply circuit 23 and the control power supply terminal 20d and controlled by the charging control circuit 22 to turn on and off outputting of the control power from the control power supply terminal 20d.

Referring to FIG. 2, the cell driver 3 is provided with a discharging terminal 30b to which the DC power is inputted from the secondary cell 11 of the battery pack 1; a ground terminal 30c connected to the ground; a control power supply terminal 30d for outputting the control power; a discharging control terminal 30f to which the discharging control signal is inputted; a temperature detection terminal 30g to which the output of the temperature detection element 13 of the battery pack 1 is inputted. Thus, when the battery pack 1 is connected to the cell driver 3, the discharging terminal 10b, the ground terminal 10c, the control power supply terminal 10d, the discharging control terminal 10f and the temperature detection terminal 10g of the battery pack 1 are respectively connected to the discharging terminal 30b, the ground terminal 30c, the control power supply terminal 30d, the discharging control terminal 30f and the temperature detection terminal 30g of the cell driver 3 to be conducted with each other.

Further, the cell driver 3 has a motor 31, e.g., an impact driver, connected between the discharging terminal 30b and the ground terminal 30c to operate by using the secondary cell 11 of the battery pack 1 as a power source. Furthermore, the cell driver 3 includes a switch 32 for connecting or disconnecting between the discharging terminal 30b and the motor 31 by manual operation; a control power supply circuit 33 for receiving the DC power via the discharging terminal 30b and the switch 32 from the secondary cell 11, and generating the control power to output from control power supply terminal 30d; a switch element 34 for connecting or disconnecting between the ground terminal 30c and the motor 31; and a discharging control circuit 35 for enabling or disabling a power supply from the battery pack 1 to the motor 31 by turning on and off the switch element 34 based on the discharging control signal inputted to the discharging control terminal 30f and the output of the temperature detection element 13 inputted to the temperature detection terminal 30g.

Turning back to the battery pack 1, the battery pack 1 further includes a charging amount control circuit 14, which detects a cell voltage across each secondary cell 11, compares the detected cell voltage with a respective predetermined target voltage V1 (FIG. 3) and, when the detected cell voltage of at least one of the secondary cells exceeds the target voltage V1, outputs a charging control signal to the charging control terminal 10e. More specifically, the charging control signal lowers to the ground a potential of the charging control terminals 10e and 20e which remains constant because the charging control terminals 10e and 20e are normally connected to the control power supply terminal 10d via, e.g., a resistor.

On the other hand, in the charger 2, the charging control circuit 22 instructs the charging circuit 21 to start outputting of the charging power when detecting a connection of the battery pack 1 based on lowering of a potential of the temperature detection terminal 20g, and to stop outputting of the charging power when the charging control signal is inputted to the charging control terminal 20e.

Figure 3:
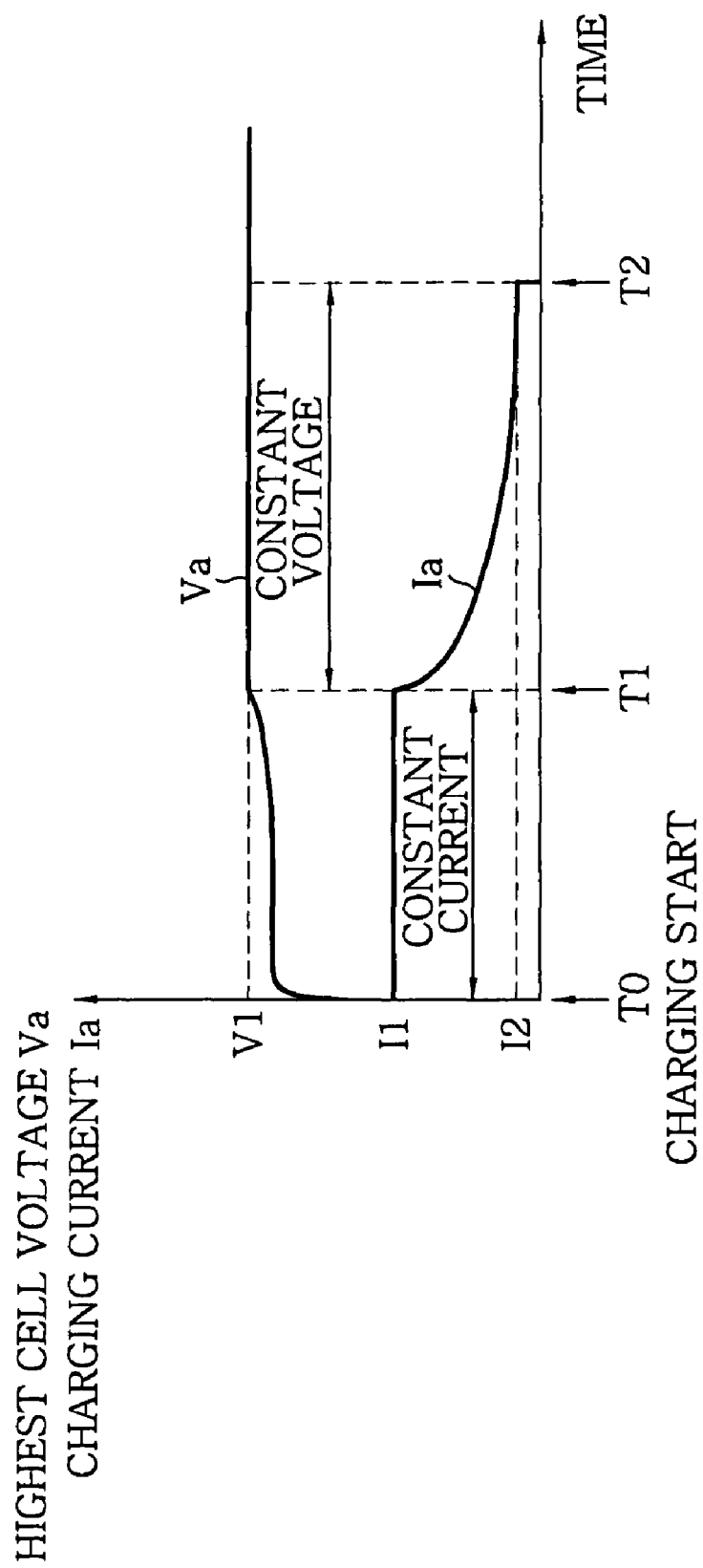
FIG. 3 illustrates a time varying charging current-maximum cell voltage relationship when the secondary cell is charged.

More specifically, as shown in FIG. 3, an initial current I1 is supplied as a charging current Ia during a duration from timing T0, where outputting of the charging power is started, to timing T1, where the charging control signal is inputted, and then Ia is reduced from the initial current I1 to a termination current I2 during a duration T1~T2 for which the charging control signal is being inputted. That is, as a constant current control is executed during the duration of T0~T1, the voltage of the secondary cell goes up to the highest voltage Va of the secondary cell (referred to as a 'highest cell voltage' hereinafter), and a constant voltage control is performed during the duration of T1~T2 so that the highest cell voltage remains in the target voltage V1.

Further, the charging control circuit 22 compares the temperature detected by the temperature detection element 13 (referred to as a 'detected temperature' hereinafter) with a predetermined threshold temperature (e.g., 70° C.) before starting to charge or during charging and, when the detected temperature exceeds the threshold temperature, the charging control circuit 22 does not start to output the charging power or stops outputting the charging power. Herein, the charging control circuit 22 stops the outputting of the charging power from the charging circuit 21 by switching the switch circuit 24 off and stopping the outputting of the charging power.

Figure 4:
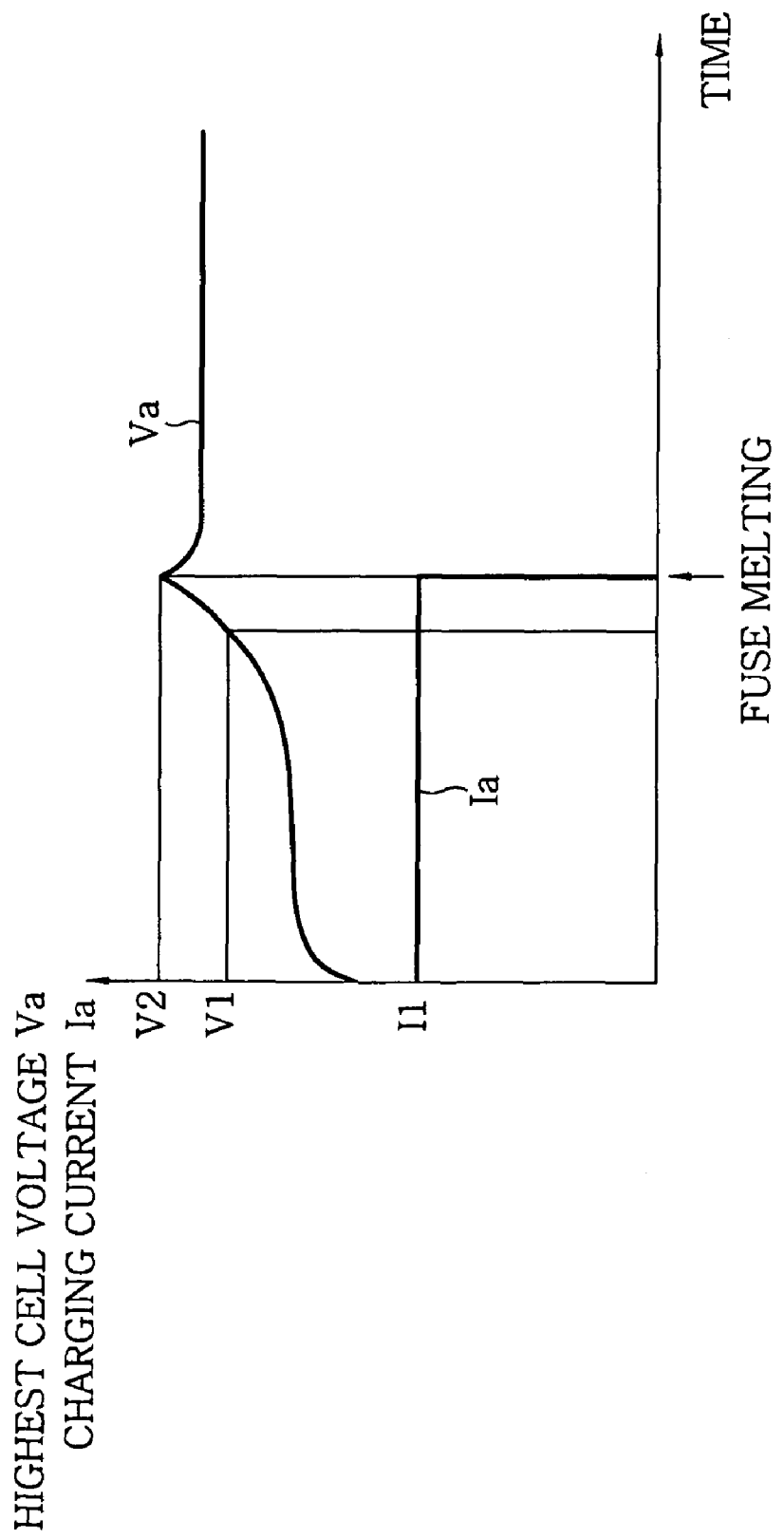
FIG. 4 is a view for explaining operation of a protection circuit in the embodiment in accordance with the present invention.

Meanwhile, the battery pack 1 also includes a protection circuit 15 blocking the current path from the charger 2 to the secondary cell 11. The protection circuit 15 detects a voltage of each secondary cell, compares the detected cell voltage with an upper limit voltage V2 higher than the respective target voltage, and, when the detected cell voltage of at least one of the secondary cells exceeds the upper limit voltage V2 (that is, the highest cell voltage Va exceeds the upper limit voltage V2), makes the fuse 12 melted, as shown in FIG. 4. With the protection circuit 15, even if, e.g., the charging amount control circuit 14 or charger 2 becomes out of order, an abnormal generated heat caused by overcharging can be prevented.

In addition, the battery pack 1 has an overdischarging prevention circuit 16. The overdischarging prevention circuit 16 detects a voltage of each secondary cell 11, compares the detected cell voltage with a lower limit voltage lower than the respective target voltage V1, and, when the cell voltage of at least one of the secondary cells is below the lower limit voltage, outputs the discharging control signal to the discharging control terminal 10$f$.

More specifically, the discharging control signal lowers to the ground a potential of the discharging control terminals 10$f$ and 30$f$ which remains constant because the discharging control terminals 10$f$ and 30$f$ are normally connected to the control power supply terminal 10$d$ via, e.g., a resistor.

In the cell driver 3, when the discharging control signal is inputted from the battery pack 1 to the discharging control terminal 30$f$ or a temperature detected by the temperature detection element 13 exceeds the predetermined threshold temperature (e.g., 70° C.), the discharging control circuit 35 stops supplying a power from the secondary cell 11 to the motor 31 by turning off the switch element 34.

The battery pack 1 also includes a power supply switch circuit 17. The power supply switch circuit 17 is turned on only when a desired control power is inputted to the control power supply terminal 10$d$ and supplies the control power inputted from the control power supply terminal 10$d$ to the charging control circuit 14, the protection circuit 15 and the overdischarging control circuit 16. Thus, while the battery pack 1 is connected to the charger 2 or the cell driver 3, the charging control circuit 14, the protection circuit 15 and the overdischarging control circuit 16 operate by using the control power supplied from the charger 2 or the cell driver 3.

Herein, the charging control circuit 14 and the overdischarging control circuit 16 use only the control power inputted from the control power supply terminal 10$d$ as a power source and, accordingly, are not supplied a power and do not operate, while neither of the charger 2 and the cell driver 3 are connected to the battery pack. On the other hand, the protection circuit 15 is supplied a power even when the control power is not inputted to the control power supply terminal 10$d$, which is because as follows. For example, there may be cases that a connection error occurs in between the control power supply terminals 10$d$ and 20$d$, the control power supply circuit 23 in the charger 2 becomes out of order, and the like. In these cases, despite inputting of the charging power to the charging terminal 10$a$, the control power may be not inputted to the control power supply terminal 10$d$ and, accordingly, an overcharging may occur. Therefore, in the embodiment of the present invention, there is employed a configuration that the protection circuit 15 operates by using the secondary cell 11 as a power source while neither the charger 2 nor the cell driver 3 are connected to the battery pack 1.

More specifically, the battery pack 1 includes a protection power supply switch 18$a$ provided between the terminal at the high voltage side of the serial circuit of the secondary cells and the protection circuit 15, and a switch control circuit 18$b$. The protection power supply switch 18$a$ switches on and off the power supply from the secondary cell 11 to the protection circuit 15. The switch control circuit 18$b$ uses the secondary cell 11 as a power source and controls the protection power supply switch 18$a$ to switch on or off based on states of the power supply switch circuit 17.

That is, the switch control circuit 18$b$ performs a continuous switch-on operation where the protection power supply switch 18$a$ remains switched on during a duration for which the power supply switch circuit 17 is switched on, i.e., the battery pack 1 is connected to the charger 2 or the cell driver 3 and the control power is supplied to the battery pack 1. Further, the switch control circuit 18$b$ executes an intermittent switch-on operation where the protection power supply switch 18$a$ is intermittently switched on for, e.g., one second every 120 seconds (i.e., on-duty cycle is $\frac{1}{120}$) and a power is intermittently supplied from the secondary cell 11 to the protection circuit 15 during a duration for which the power supply switch circuit 17 is turned off, i.e., the battery pack 1 is connected to neither the charger 2 nor the cell driver 3 and the control power is not supplied to the battery pack 1.

Further, the switch control circuit 18$b$ monitors an output of the protection circuit 15 during the intermittent, switch-on operation, terminates the intermittent switch-on operation after the protection circuit 15 starts to generate an output for melting the fuse 12 and moves to the continuous switch-on operation. Accordingly, there is no case that the supply of power to the protection circuit 15 stops while the fuse 12 is melted.

In the present embodiment, an off duration for switching off the protection power supply switch 18$a$ (i.e., a state where the protection circuit 15 does not work) is 119 seconds and an on duration for switching on the protection power supply switch 18$a$ (i.e., a state where the protection circuit 15 works) is a second, in the example of the intermittent switch-on operation. However, durations are not limited thereto and may be set to suppress power consumption as long as a security can be assured, based on the characteristics of the secondary cell 11 and the charger 2.

From a viewpoint of the security, it is preferable that the protection circuit 15 continuously operates during the period of time for which the control power is supplied as described above. However, there may be reduced the power consumption by causing the switch control circuit 18$b$ to execute the intermittent switch-on operation for a period of time excluding the period of time for which the fuse 12 is melted so that the protection circuit 15 always intermittently operates.

Since the above described configurations can be realized by the well known arts, a full description and drawings are omitted herein. Similar to general circuits, the above circuits may be made compact by forming the circuits by an integrated circuit (IC) to reduce a number of components and a mounting area of the circuit. Therefore, there may be formed two or more among the charging amount control circuit 14, the protection circuit 15, overdischarging prevention circuit 16, the power supply switch circuit 17, switch control circuit 18a and the protection switch 18b by a single IC chip.

With the above configurations, since the protection circuit 15 operates even while the control power is not supplied, an overcharging can be prevented. Further, since the charging control circuit 14 and the overdischarging prevention circuit 16 do not operate while the control power is not supplied, consumption of the secondary cell 11 in the standby state can be suppressed when comparing to the case that the charging control circuit 14 and the overdischarging prevention circuit 16 operate by using the secondary cell 11 as a power source.

In addition, since the protection circuit 15 intermittently operates while the control power is not supplied, consumption of the secondary cell 11 in the standby state can be suppressed when comparing to the case that the protection circuit 15 continues to operate.

The charging control circuit 14 may use the secondary cell 11 as a power source instead of the control power. In this case, if there is provided a switch circuit (not shown) switching off feeding power from the secondary cell 11 to the charging control circuit 14, for example, while the control power (referred to as a 'control trigger signal' in claims) is not inputted to the control power supply terminal 10d, consumption of the secondary cell 11 can be suppressed by switching off feeding power to the charging control circuit 14 while the battery pack 1 is connected to neither the charger 2 nor the cell driver 3, or the battery pack 1 is connected to the charger 2 but the switch circuit 24 in the charger 2 is switched off and there is no output of the control power.

While the invention has been shown and described with respect to the embodiments, it will be understood by those skilled in the art that various changes and modifications may be made without departing from the scope of the invention as defined in the following claims.

What is claimed is:

1. A charging controller connected to one or more secondary cells and detachably connected to a charger or a cell driver, each of the charger and the cell driver having a control power supply circuit supplying a control power to the charging controller, the charging controller comprising:
   a charging amount control circuit detecting a cell voltage of each secondary cell; comparing the detected cell voltage with a predetermined target voltage; and outputting a charging control signal for instructing the charger to reduce a charging current when the detected cell voltage exceeds the target voltage; and
   a protection circuit detecting a cell voltage of each secondary cell; comparing the detected cell voltage with a predetermined upper limit voltage higher than the target voltage; and cutting off a current path from the charger to the secondary cell when the detected cell voltage exceeds the upper limit voltage,
   wherein both of the protection circuit and the charging amount control circuit operate by using the control power as a power source while the control power is supplied to the charging controller.

2. The charging controller of claim 1, wherein the protection circuit intermittently operates while the control power is not supplied to the charging controller.

3. The charging controller of claim 2, further comprising:
   an over discharging prevention circuit detecting a cell voltage of each secondary cell; comparing the detected cell voltage with a predetermined lower limit voltage lower than the target voltage; and outputting a discharging control signal for instructing the cell driver to stop receiving power from the secondary cells when the cell voltage is lower than the lower limit voltage,
   wherein the over discharging prevention circuit does not operate while the control power is not supplied to the charging controller.

4. The charging controller of claim 1, further comprising:
   an over discharging prevention circuit detecting a cell voltage of each secondary cell; comparing the detected cell voltage with a predetermined lower limit voltage lower than the target voltage; and outputting a discharging control signal for instructing the cell driver to stop receiving power from the secondary cells when the cell voltage is lower than the lower limit voltage,
   wherein the over discharging prevention circuit does not operate while the control power is not supplied to the charging controller.

5. The charging controller of claim 1, wherein while the control power is not supplied to the charging controller, the protection circuit operates by using the secondary cells as a power source and the charging amount control circuit does not operate.

6. A charging controller connected to one or more secondary cells and detachably connected to a charger or a cell driver, the charging controller comprising:
   a charging amount control circuit detecting a cell voltage of each secondary cell; comparing the detected cell voltage with a predetermined target voltage; and outputting a charging control signal for instructing the charger to reduce a charging current when the detected cell voltage exceeds the target voltage; and
   a protection circuit detecting a cell voltage of each secondary cell; comparing the detected cell voltage with a predetermined upper limit voltage higher than the target voltage; and cutting off a current path from the charger to the secondary cells when the detected cell voltage exceeds the upper limit voltage,
   wherein the charging amount control circuit operates by using the secondary cells as a power source when a control trigger signal is being inputted from the charger while the secondary cells are charged by the charger.

7. The charging controller of claim 6, further comprising:
   an over discharging prevention circuit detecting a cell voltage of each secondary cell; comparing the detected cell voltage with a predetermined lower limit voltage lower than the target voltage; and outputting a discharging control signal for instructing the cell driver to stop receiving power from the secondary cells when the cell voltage is lower than the lower limit voltage,
   wherein the over discharging prevention circuit does not operate while the control power is not supplied to charging controller.

8. The charging controller of claim 6, wherein the control trigger signal serves as a control power by which the protection circuit operates.

9. The charging controller of claim 8, wherein the protection circuit intermittently operates by using the secondary cells as a power source while the control power is not supplied to the charging controller.

10. The charging controller connected to one or more secondary cells and detachably connected to a charger or a cell driver, each of the charger and the cell driver having a control power supply circuit supplying a control power to the charging controller, the charging controller comprising:
    a charging amount control circuit detecting a cell voltage of each secondary cell;
    comparing the detected cell voltage with a predetermined target voltage; and outputting a charging control signal for instructing the charger to reduce a charging current when the detected cell voltage exceeds the target voltage;

a fuse connected between the secondary cells and charging terminal to which the charger is connected and;

a protection circuit detecting a cell voltage of each secondary cell; comparing the detected cell voltage with a predetermined upper limit voltage higher than the target voltage; and cutting off a current path from the charger to the secondary cells by melting the fuse when the detected cell voltage exceeds the upper limit voltage, a protection power supply switch which is switched on or off to supply or stop supply a power from the secondary cells to the protection circuit; and a switch control circuit controlling the protection power supply switch to be switched on or off, wherein the charging amount control circuit does not operate while the control power is not supplied to the charging controller, wherein the switch control circuit executes an intermittent switch-on-operation so that the protection power supply switch is intermittently switched on while the control power is not supplied to the charging controller, and the switch control circuit monitors an output of the protection circuit during the intermittent switch-on operation, terminates the intermittent switch-on operation after the protection circuit starts to generate an output for melting the fuse and moves to a continuous switch-on operation.

* * * * *